US010702973B2

(12) United States Patent
Chang et al.

(10) Patent No.: US 10,702,973 B2
(45) Date of Patent: Jul. 7, 2020

(54) COOLANT FLOW GUIDE FOR GRINDER

(71) Applicant: HURISE CO., LTD., Taichung (TW)

(72) Inventors: Jung-Feng Chang, Taichung (TW);
Jung-Sheng Chang, Taichung (TW)

(73) Assignee: HURISE CO., LTD., Taichung (TW)

( * ) Notice: Subject to any disclaimer, the term of this patent is extended or adjusted under 35 U.S.C. 154(b) by 293 days.

(21) Appl. No.: 15/909,722

(22) Filed: Mar. 1, 2018

(65) Prior Publication Data
US 2018/0272498 A1 Sep. 27, 2018

(30) Foreign Application Priority Data

Mar. 23, 2017 (TW) .............................. 106109764 A

(51) Int. Cl.
*B24B 55/02* (2006.01)
*B24D 5/10* (2006.01)
*B23Q 1/01* (2006.01)
*B23Q 11/00* (2006.01)
*B24B 41/02* (2006.01)

(52) U.S. Cl.
CPC .............. *B24B 55/02* (2013.01); *B23Q 1/015* (2013.01); *B23Q 11/0042* (2013.01); *B23Q 11/0053* (2013.01); *B24B 41/02* (2013.01); *B24D 5/10* (2013.01)

(58) Field of Classification Search
CPC ....... B24B 55/02; B24B 55/03; B24B 55/045; B24B 41/02; B24D 5/10; B23Q 1/015; B23Q 11/042; B23Q 11/053
See application file for complete search history.

(56) References Cited

U.S. PATENT DOCUMENTS

| 5,313,743 | A | * | 5/1994 | Peschik | ................... B24B 55/02 451/449 |
| 5,331,769 | A | * | 7/1994 | Walton | ....................... B03C 1/08 451/249 |
| 5,586,848 | A | * | 12/1996 | Suwijn | ...................... B23F 9/00 409/137 |
| 6,206,621 | B1 | * | 3/2001 | Sebring | ................. B23F 17/003 408/67 |
| 9,168,674 | B2 | * | 10/2015 | Walker | ................... B23D 59/02 |

* cited by examiner

*Primary Examiner* — Dung Van Nguyen
(74) *Attorney, Agent, or Firm* — Muncy, Geissler, Olds & Lowe, P.C.

(57) ABSTRACT

A coolant flow guide for grinder includes a base including a tilted bottom wall having a predetermined tilt angle, a peripheral wall disposed around the tilted bottom wall and defining with the tilted bottom wall a diversion channel having a top opening and a partition wall located on the tilted bottom wall to divide the diversion channel into two flow passages that slope downwardly to the diversion port, and a workpiece positioning unit mounted on the base above the flow passages for holding a workpiece. Thus, when the grinder is operated to grind the workpiece, the debris thus produced is carried by the applied coolant to flow through the flow passages to the outside of the base via the diversion port.

6 Claims, 7 Drawing Sheets

COOLANT FLOW GUIDE FOR GRINDER

BACKGROUND OF THE INVENTION

1. Field of the Invention

The present invention relates to grinder technology and more particularly, to a coolant flow guide for grinder.

2. Description of the Related Art

FIG. 1 illustrates a conventional grinder machine tool, which comprises a base, a workpiece positioning unit, a coolant sprayer unit and a grinding unit. The workpiece positioning unit is mounted on a top side of the base for holding a workpiece. The grinding unit is mounted at one side of the base for grinding the workpiece at the workpiece positioning unit. The coolant sprayer unit is operable to spray a coolant on to the workpiece and the grinding unit for lowering the temperature. In order to guide the coolant sprayed by the coolant sprayer unit, an endless groove is located on the border area of the top of the base, and a diversion port is provided in communication with the endless groove. Thus, the applied coolant can flow through the endless groove and the diversion port to the outside of the base for collection and filtration.

However, since the said endless groove is shallow and disposed in horizontal, the debris produced from the workpiece during grinding and the waste coolant can be cumulated in the endless groove or can flow over the endless groove, causing cleaning problems.

In conclusion, there are still some inconveniences associated with the conventional coolant flow guide technique. An improvement in this regard is needed.

SUMMARY OF THE INVENTION

The present invention has been accomplished under the circumstances in view. It is the main object of the present invention to provide a coolant flow guide for grinder, which facilitates the user to collect waste coolant, preventing waste coolant from flowing to other parts of the grinder to cause cleaning problems or even component damage.

To achieve this and other objects of the present invention, a coolant flow guide comprises a base. The base comprises a tilted bottom wall, a peripheral wall and a partition wall. The tilted bottom wall has a predetermined tilt angle. The peripheral wall is disposed around the tilted bottom wall, defining with the tilted bottom wall a diversion channel having a top opening. The peripheral wall has a diversion port cut therethrough. The partition wall is located on the tilted bottom wall to divide the diversion channel into two flow passages. The two flow passages slope downwardly to the diversion port.

Preferably, the coolant flow guide further comprises a workpiece positioning unit for holding a workpiece. The workpiece positioning unit is mounted on the base above the flow passages.

During operation of the grinding unit to grind a workpiece at the workpiece positioning unit, the coolant sprayer unit of the grinder is controlled to spray a coolant onto the grinding unit and the workpiece for lowering the temperature. The debris produced from the workpiece is than carried by the sprayed coolant to flow into the flow passages. Subject to the tilted design of the flow passages, the debris can be carried by the sprayed coolant to flow out of the base through the diversion port for collection and filtration, preventing the debris from being carried by the sprayed coolant to the other parts of the grinder to cause cleaning problems.

Other advantages and features of the present invention will be fully understood by reference to the following specification in conjunction with the accompanying drawings, in which like reference signs denote like components of structure.

DETAILED DESCRIPTION OF THE INVENTION

Figure 1:
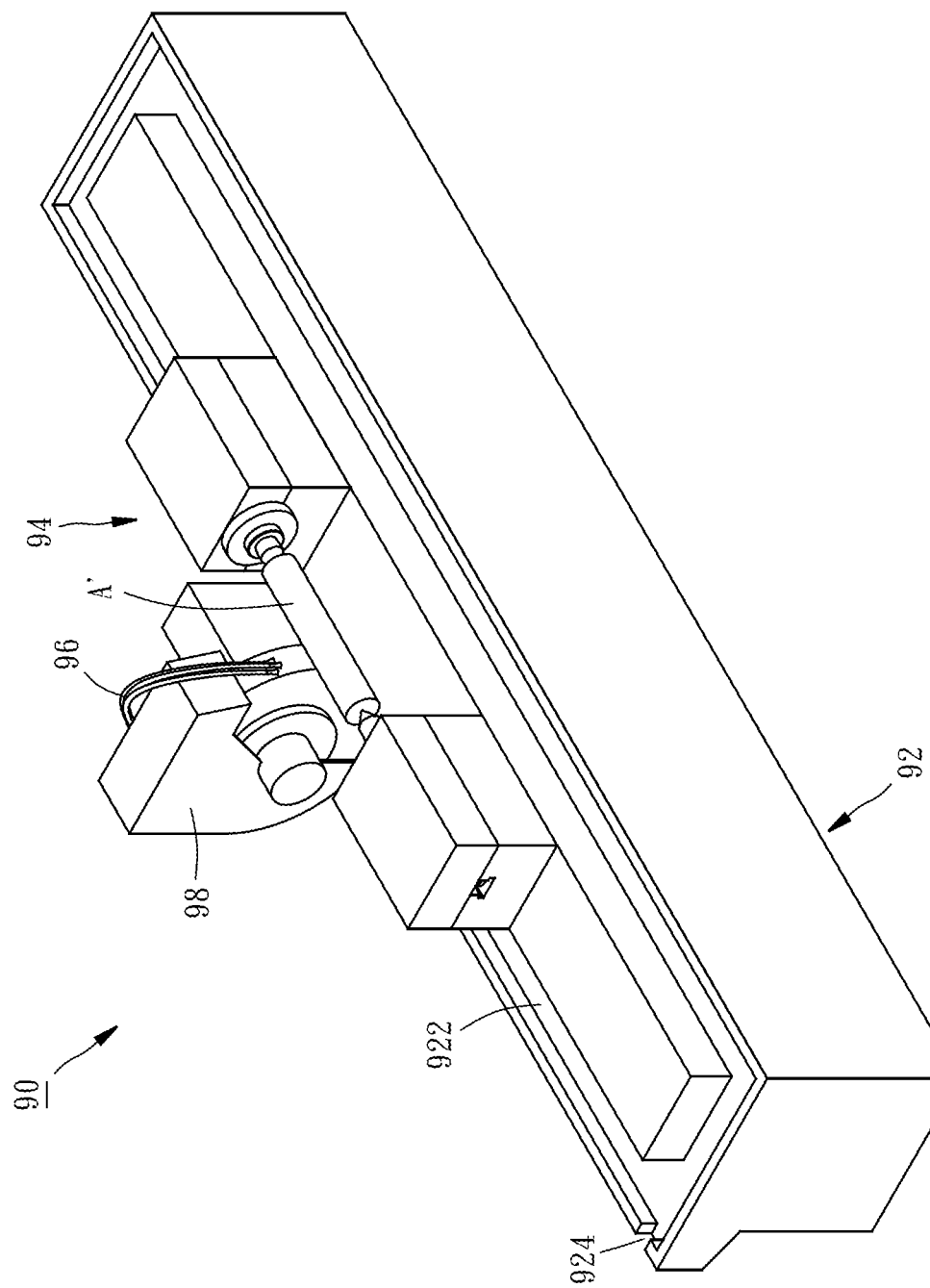
FIG. 1 is an oblique top elevational view of a conventional grinder machine tool.

Referring to FIGS. 2-6, a coolant flow guide 10 for grinder in accordance with the present invention is shown. The coolant flow guide 10 comprises a base 20 and a workpiece positioning unit 30 for positioning a workpiece.

The base 20 is an elongated cylinder structure, comprising an tilted bottom wall 22, a peripheral wall 24, a partition wall 26 and a shoulder 28. The tilted bottom wall 22 defines a predetermined tilt angle θ. The peripheral wall 24 surrounds the tilted bottom wall 22 and defines with the tilted bottom wall 22 a diversion channel 25 with a top opening 23. The peripheral wall 24 defines therein a diversion port 27. The partition wall 26 is located on the tilted bottom wall 22 to divide the diversion channel 25 into two flow passages 252,254. The two flow passages 252,254 slope downwardly to the diversion port 27. Each flow passage 252,254 is adapted for guiding a coolant. The tilted bottom wall 22, the peripheral wall 24 and the partition wall 26 are made in integrity. Further, the peripheral wall 24 extends upwardly around the tilted bottom wall 22. Further, the thickness and length of the tilted bottom wall 22 and the thickness and height of the peripheral wall 24 and the partition wall 26 are not limited and can be changed according to actual requirements.

More specifically, the peripheral wall 24 comprises a front wall 242, a back wall 244 and a connection wall 246. The front wall 242 and the back wall 244 are disposed opposite to each other. The front wall 242 and the back wall 244 have respective bottom walls thereof respectively connected to two opposite lateral sides of the tilted bottom wall 22. The front wall 242 and the back wall 244 respectively define with the partition wall 26 one respective said flow passage 252,254. The connection wall 246 has two opposite ends thereof respectively connected to the front wall 242 and the back wall 244. The connection wall 246 has a bottom side thereof connected to the tilted bottom wall 22. The diversion port 27 cuts through the connection wall 246. The partition wall 26 is connected to the connection wall 246, dividing the diversion port 27 into two flow guide holes 272. Each flow passage 252,254 slopes downwardly to one respective flow guide hole 272. It is to be noted that the thickness and height of the front wall 242, the back wall 244 and the connection wall 246 are not limited and can be changed according to actual requirements.

The shoulder 28 is located on a top edge of the front wall 242 and transversely extending in direction away from the flow passages 252,254. The shoulder 28 comprises an oblique guide surface 282 and a flange 284. The oblique guide surface 282 has one side thereof sloping downwardly to the front wall 242. The flange 284 is located on an opposite side of the oblique guide surface 282 for stopping the coolant from flowing over the shoulder 28. In the present preferred embodiment, the oblique guide surface 282 and flange 284 of the shoulder 28 are made in integrity. In other embodiments, the flange 284 is affixed to the oblique guide surface 282 by soldering or fastening means.

The connection relationship between the base 20 and the workpiece positioning unit 30 are explained hereinafter. The workpiece positioning unit 30 is mounted to the base 20 above the flow passages 252,254, more specifically, the base 20 comprises a plurality of support members 29 that can be, but not limited to, elongated bars. Each support member 29 has two opposite ends respectively affixed to the oblique guide surface 282 and the back wall 244. Further, each support member 29 extends over and is affixed to the partition wall 26. Further, the support members 29 are spaced from one another by a predetermined pitch. The workpiece positioning unit 30 is supported on the support members 29.

The workpiece positioning unit 30 comprises a rail 32, a spindle holder 34 and a tailstock 36. The rail 32 is mounted on the support members 29. The spindle holder 34 and the tailstock 36 are slidably mounted on the rail 32 for holding a workpiece A.

In other embodiments of the present invention, the workpiece positioning unit 30 can cover any structure capable of carrying or positioning a workpiece, and does not necessary to include the rail 32, the spindle holder 34 and the tailstock 36.

Figure 2:
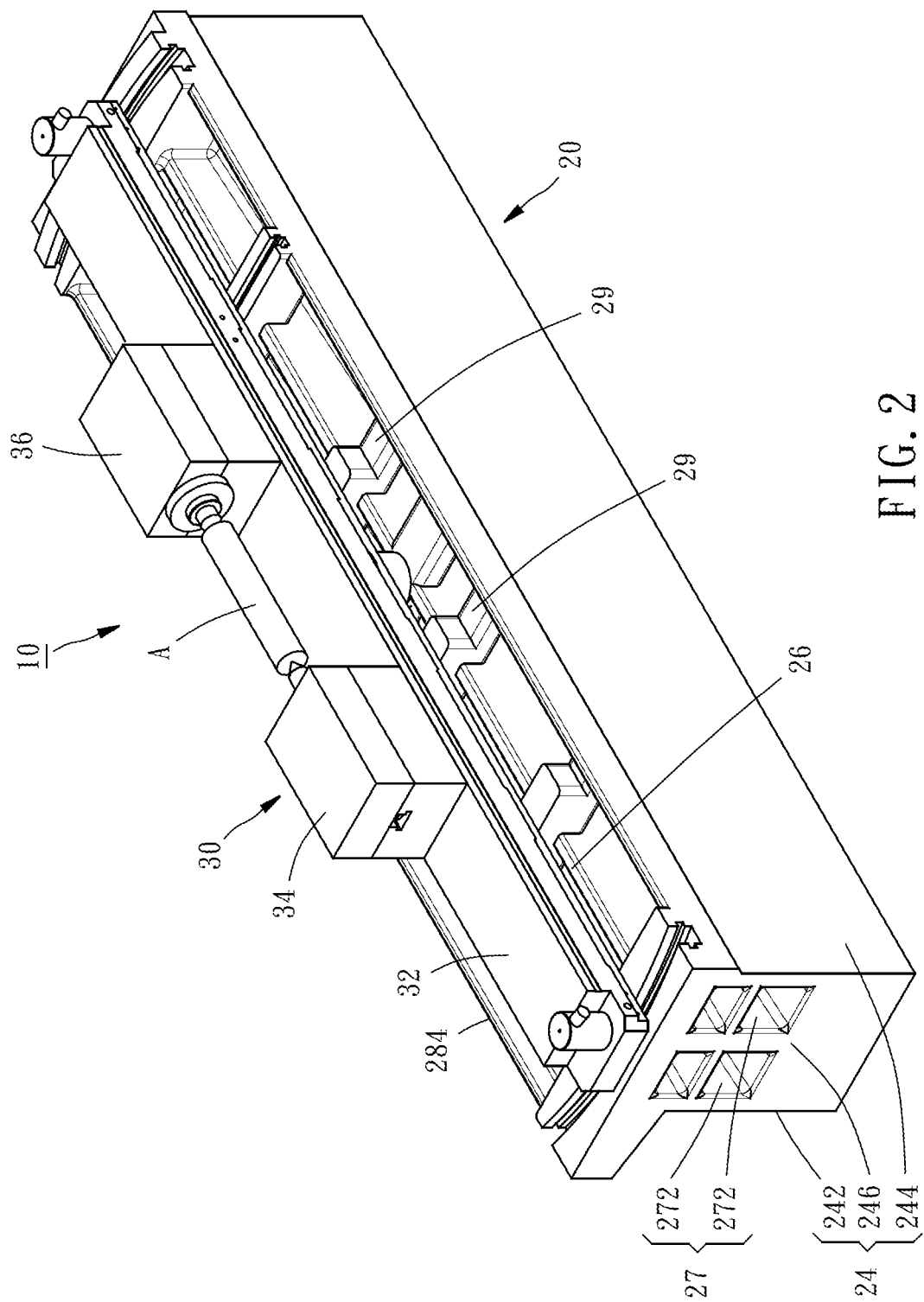
FIG. 2 is an oblique top elevational view of a preferred embodiment of the present invention, illustrating a workpiece positioning unit joined to a base.
Figure 3:
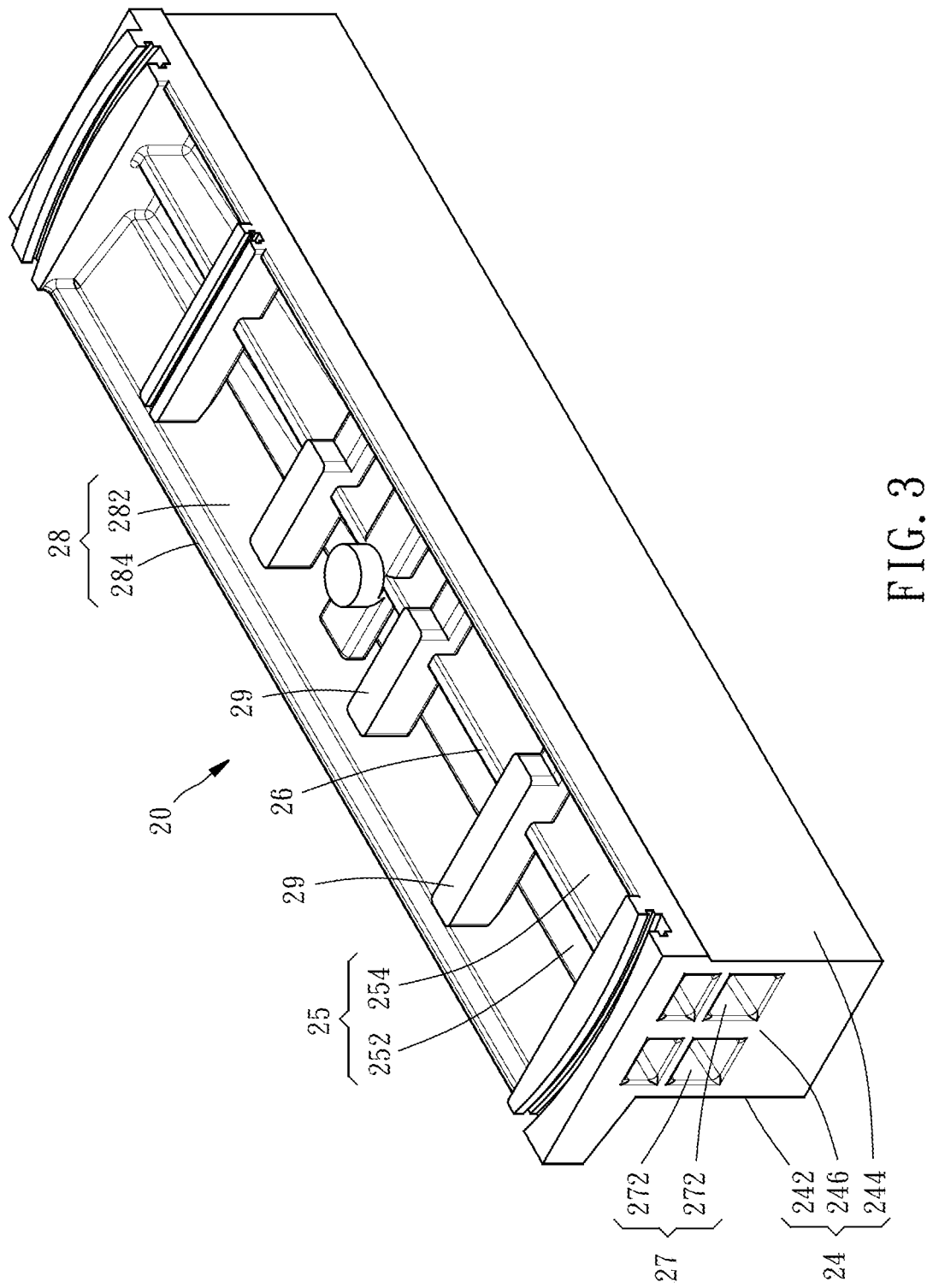
FIG. 3 is an oblique top elevational view of the preferred embodiment of the present invention.
Figure 4:
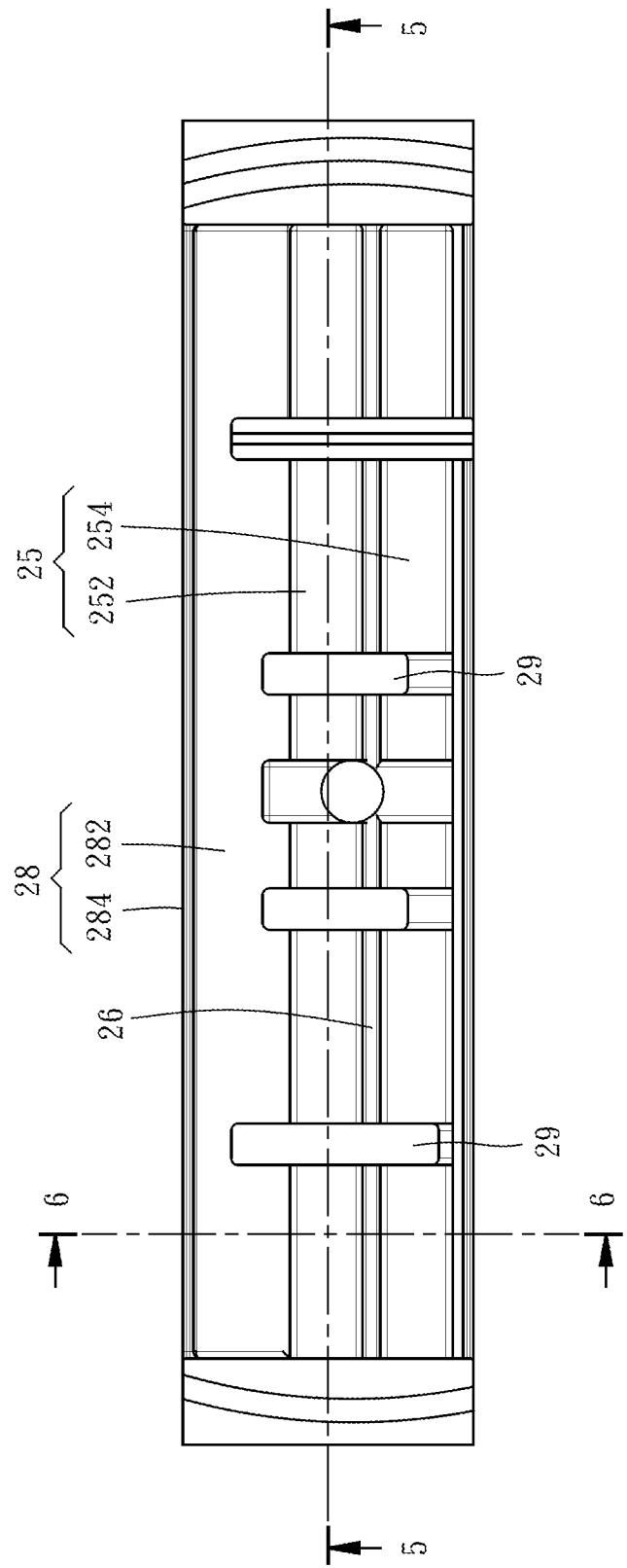
FIG. 4 is a top view of the preferred embodiment of the present invention.
Figure 5:
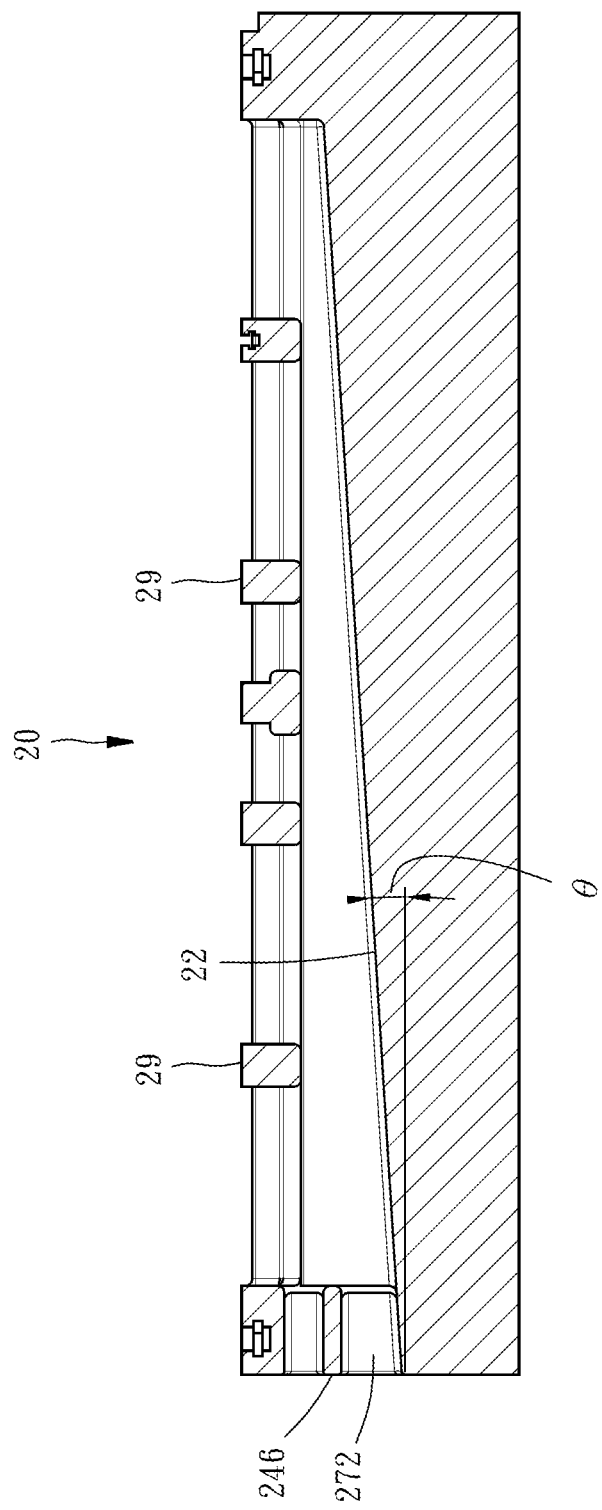
FIG. 5 is a sectional view taken along line 5-5 of FIG. 4.
Figure 6:
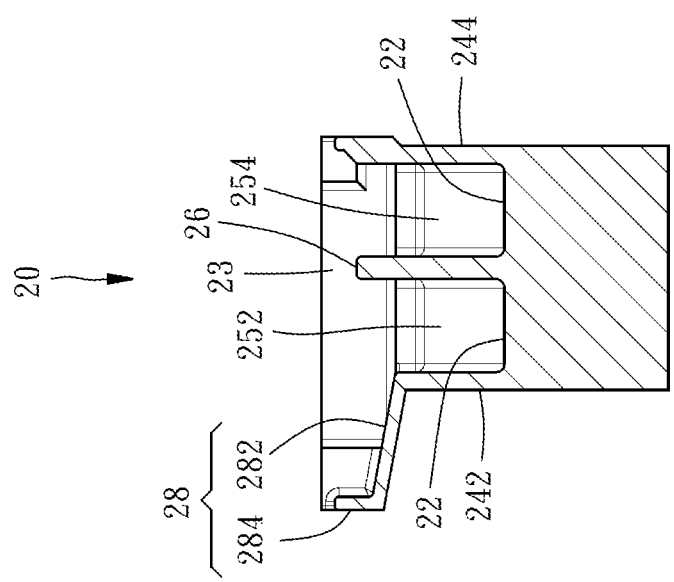
FIG. 6 is a sectional view taken along line 6-6 of FIG. 4.
Figure 7:
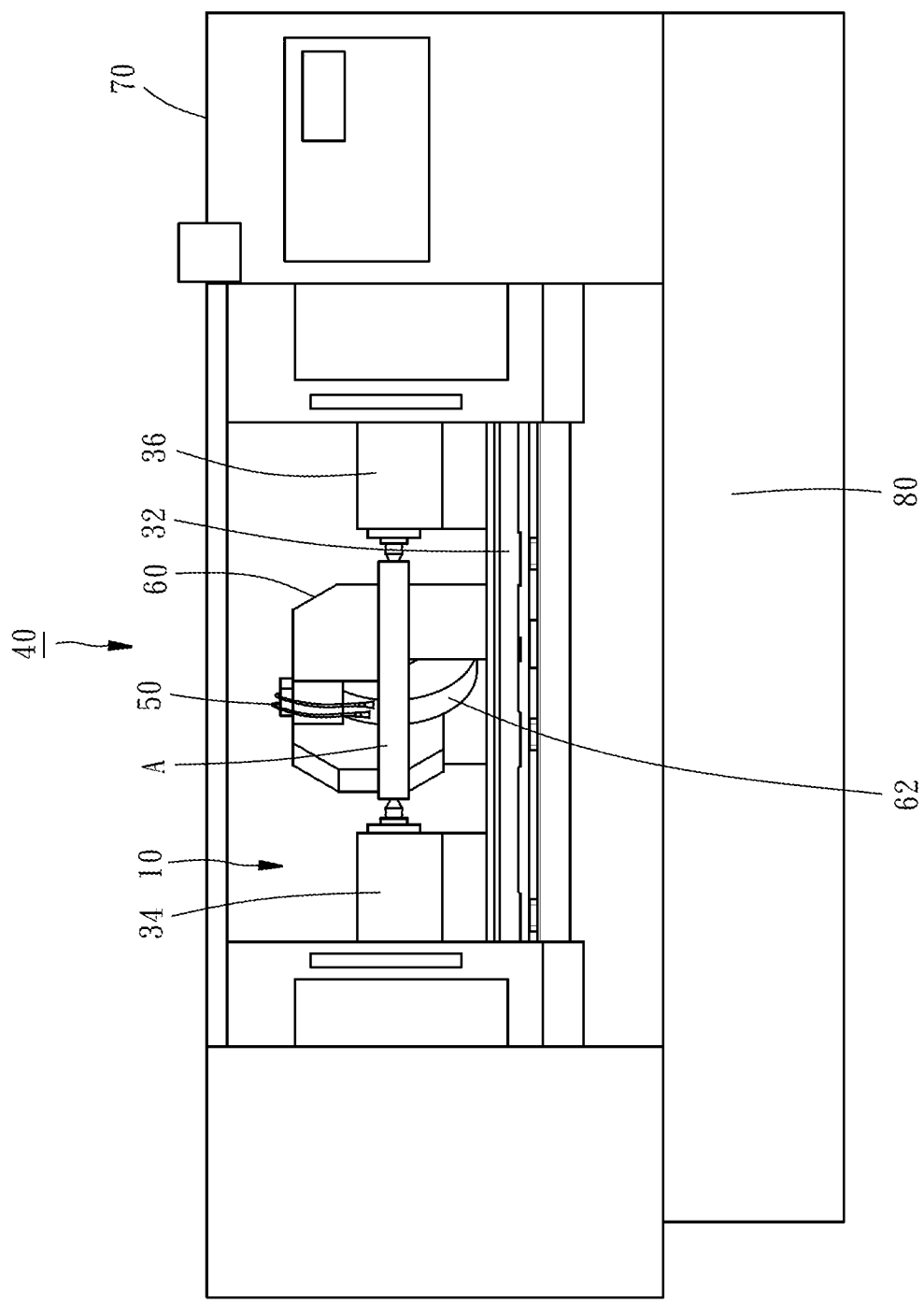
FIG. 7 is a schematic side view. Illustrating the coolant flow guide installed in the machine base of the grinder and cover by the cover of the grinder.

Referring to FIGS. 2 and 7, when the coolant flow guide 10 of the present invention is used in a grinder 40, mount the coolant flow guide 10, a coolant sprayer unit 50 and a grinding unit 60 are mounted in a machine base 80, and then mount around the machine base 80. During rotation of a grinding wheel 62 of the grinding unit 60 to grind the workpiece A at the workpiece positioning unit 30, the coolant sprayer unit 50 is operated to spray a coolant onto the workpiece A and the grinding wheel 62 for lowering the temperature, and the debris produced from the workpiece A is carried by the sprayed coolant to flow through the top opening 23 into the flow passages 252,254, or over the oblique guide surface 282 toward the flow passage 252. Subject to the tilted design of the flow passages 252,254, the debris can be carried by the sprayed coolant to flow out of the base 20 through the flow guide hole 272, or to flow through the flow guide hole 272 to the outside of the grinder 40 via a connected delivery pipe (not shown) for collection and filtration, preventing the debris from being carried by the sprayed coolant to the other parts of the grinder 40.

It's worth mentioning that the rotation axis of the grinding wheel 62 of the grinding unit 60 defines with the workpiece A a non-90 degree contained angle. In other embodiments, the rotation axis of the grinding wheel 62 of the grinding unit 60 is disposed in parallel to the workpiece A for grinding the workpiece A into different shapes from different angles or grinding different gloss and texture on the workpiece A.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coolant flow guide for use in a grinder, comprising:
   a base comprising a tilted bottom wall, a peripheral wall and a partition wall, said peripheral wall being disposed around said tilted bottom wall and defining with said tilted bottom wall a diversion channel having a top opening, said peripheral wall having a diversion port cut therethrough, said partition wall being located on said tilted bottom wall to divide said diversion channel into two flow passages, said two flow passages sloping downwardly to said diversion port;
   wherein said peripheral wall comprises a front wall, a back wall and a connection wall, said front wall and said back wall being disposed opposite to each other and respectively defining with said partition wall one respective said flow passage, said connection wall having two opposite ends thereof respectively connected to said front wall and said back wall, said connection wall having a bottom side thereof connected to said tilted bottom wall, said diversion port cutting through said connection wall;
   wherein said partition wall is connected to said connection wall to divide said diversion port into two flow guide holes; each said flow passage slopes downwardly to one respective said flow guide hole.

2. The coolant flow guide as claimed in claim 1, wherein said base further comprises a shoulder located on a top edge of said front wall, said shoulder comprising an oblique guide surface, said oblique guide surface having one side thereof sloping downwardly to said front wall.

3. The coolant flow guide as claimed in claim 2, wherein said shoulder further comprises a flange located on an opposite side of said oblique guide surface.

4. The coolant flow guide as claimed in claim 2, further comprising a workpiece positioning unit for holding a workpiece, wherein said base further comprises a plurality of support members spaced from one another by a predetermined pitch, each said support member having two opposite ends thereof respectively affixed to said oblique guide surface and said back wall, each said support member being extended over and affixed to said partition wall; said workpiece positioning unit is supported on said support members.

5. The coolant flow guide as claimed in claim 4, wherein said workpiece positioning unit comprises a rail, a spindle holder and a tailstock, said rail being supported on said support members, said spindle holder and said tailstock being slidably mounted on said rail for holding the workpiece.

6. The coolant flow guide as claimed in claim 1, further comprising a workpiece positioning unit mounted to said base above said flow passages for holding a workpiece.

* * * * *